United States Patent [19]

Vitale

[11] 4,362,035

[45] Dec. 7, 1982

[54] LOCKABLE CLOSURE

[76] Inventor: Steven Vitale, 269 Greencroft Ave., Staten Island, N.Y. 10308

[21] Appl. No.: 180,801

[22] Filed: Aug. 25, 1980

[51] Int. Cl.³ .................. B65D 39/08; B65D 55/14; E05B 63/00; F16L 35/00
[52] U.S. Cl. .................................... 70/165; 70/222; 70/231; 70/416; 217/107; 220/210
[58] Field of Search ................ 137/800; 220/210; 70/416-419, 165, 175, 222, 231; 217/107

[56] References Cited

U.S. PATENT DOCUMENTS

| | | |
|---|---|---|
| 359,714 | 3/1887 | Deming . |
| 1,171,706 | 2/1916 | Crabtree .................. 137/800 X |
| 1,231,164 | 6/1917 | Jahns et al. . |
| 1,325,189 | 12/1919 | Carter . |
| 1,701,816 | 2/1929 | Malluk et al. ............... 70/165 X |
| 1,702,532 | 2/1929 | Boomer et al. ............... 220/210 |
| 1,870,427 | 8/1932 | Stallings et al. ............... 70/231 |
| 2,016,797 | 10/1935 | Burns et al. . |
| 2,058,951 | 10/1936 | Buirk . |
| 2,092,572 | 9/1937 | Deane ............... 70/165 X |
| 2,138,871 | 12/1938 | Malluk ............... 220/210 X |
| 2,179,045 | 11/1939 | Lewis ............... 70/231 X |
| 2,565,166 | 8/1951 | Bolduc ............... 70/165 |
| 2,926,701 | 3/1960 | Campbell . |
| 3,002,368 | 10/1961 | Moberg . |
| 3,391,554 | 7/1968 | Wrenshall . |
| 3,450,148 | 6/1969 | Mongelluzzo et al. . |
| 3,554,218 | 1/1971 | Smith . |
| 3,560,130 | 2/1971 | Horhota . |
| 4,024,740 | 5/1977 | DiGiovanni ............... 70/175 |
| 4,143,530 | 3/1979 | Murtezov et al. ............... 220/210 X |

FOREIGN PATENT DOCUMENTS

| | | |
|---|---|---|
| 357806 | 8/1922 | Fed. Rep. of Germany ........ 70/165 |
| 373956 | 4/1923 | Fed. Rep. of Germany ........ 70/165 |
| 1014933 | 8/1952 | France .................. 220/210 |
| 1190429 | 10/1959 | France .................. 220/210 |
| 906832 | 9/1962 | United Kingdom . |

Primary Examiner—Ramon S. Britts
Assistant Examiner—Carl F. Pietruszka
Attorney, Agent, or Firm—Fitzpatrick, Cella, Harper & Scinto

[57] ABSTRACT

A shield is rotatably mounted to a threaded element of the closure on an axis coincident with the axis of the threaded element, so that the shield impedes access to the threaded element. The shield can be removed from the threaded element or connected to the threaded element only upon actuation of the closure by an appropriate key. Absent such actuation, the threaded element cannot be rotated for disengagement from the conduit by rotating the shield. The closure is protected against attempts to disengage it from the conduit by bonding the shield to the threaded element with an adhesive and rotating the shield.

8 Claims, 11 Drawing Figures

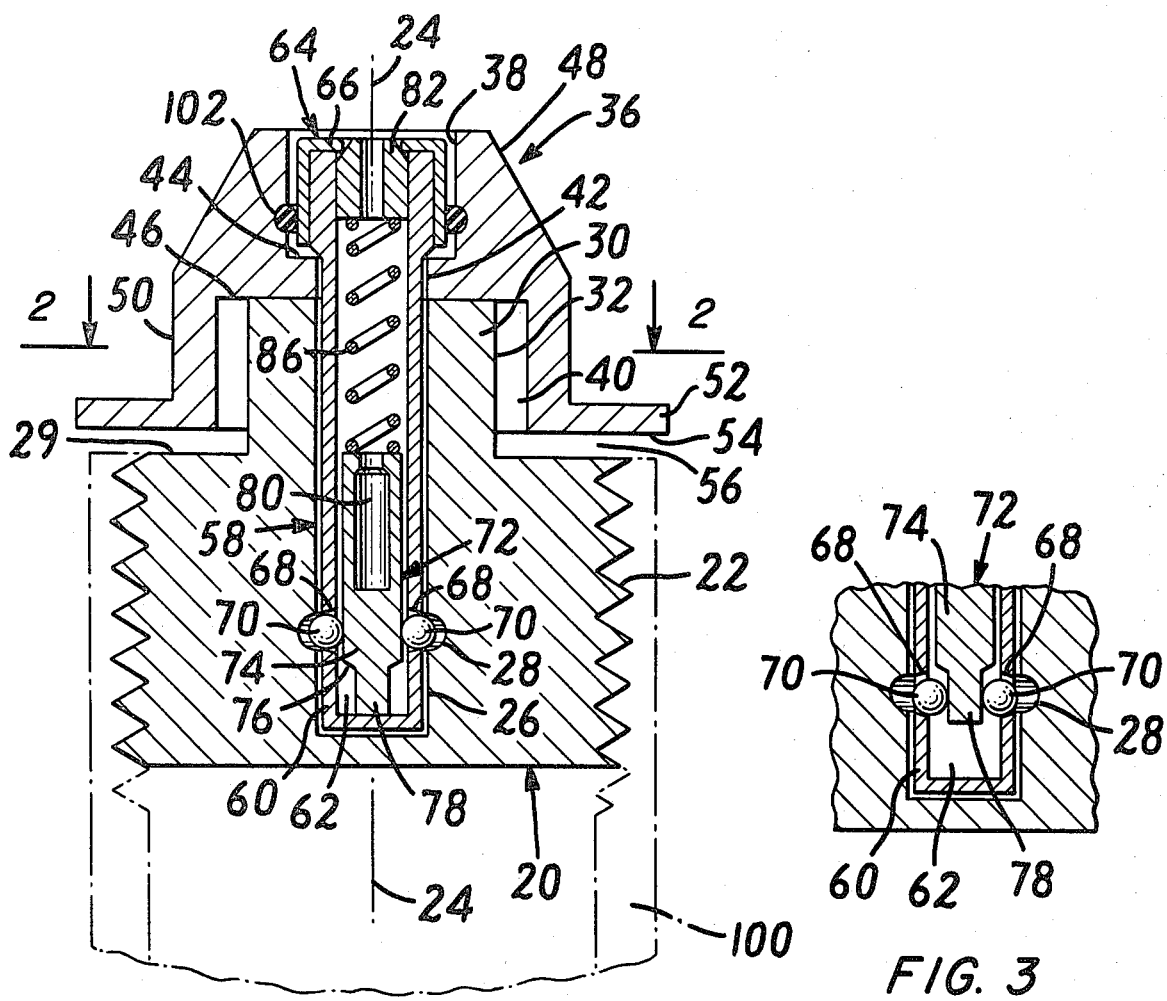
FIG. 1
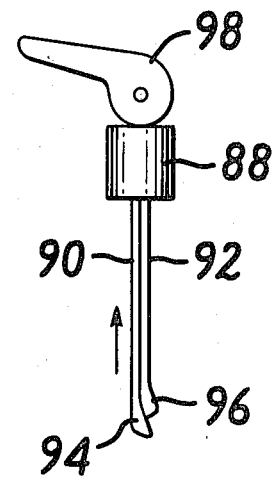
FIG. 3
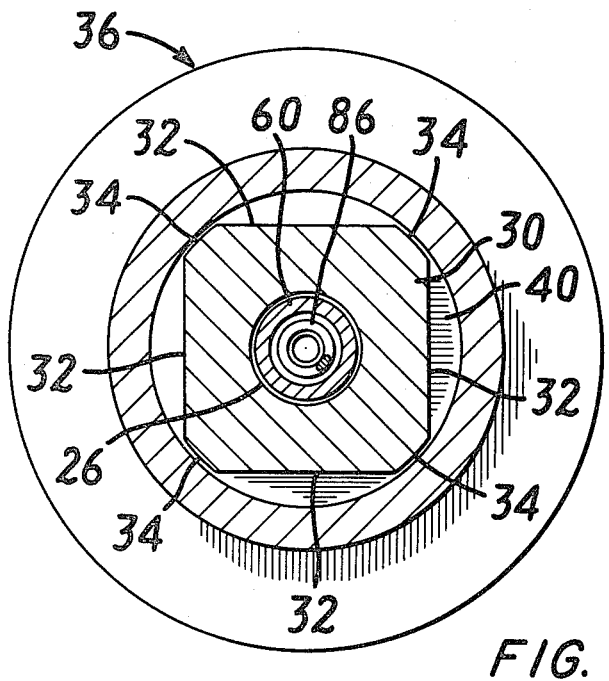
FIG. 2
FIG. 4

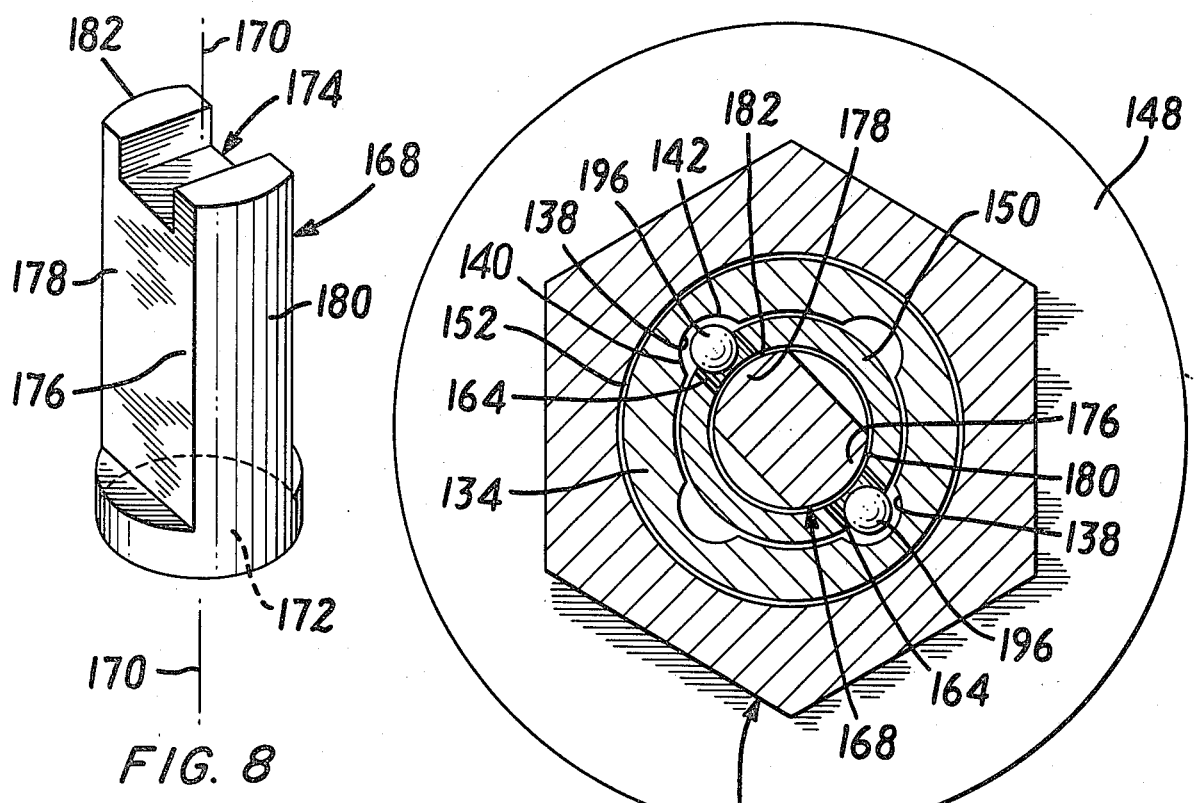
FIG. 8
FIG. 9
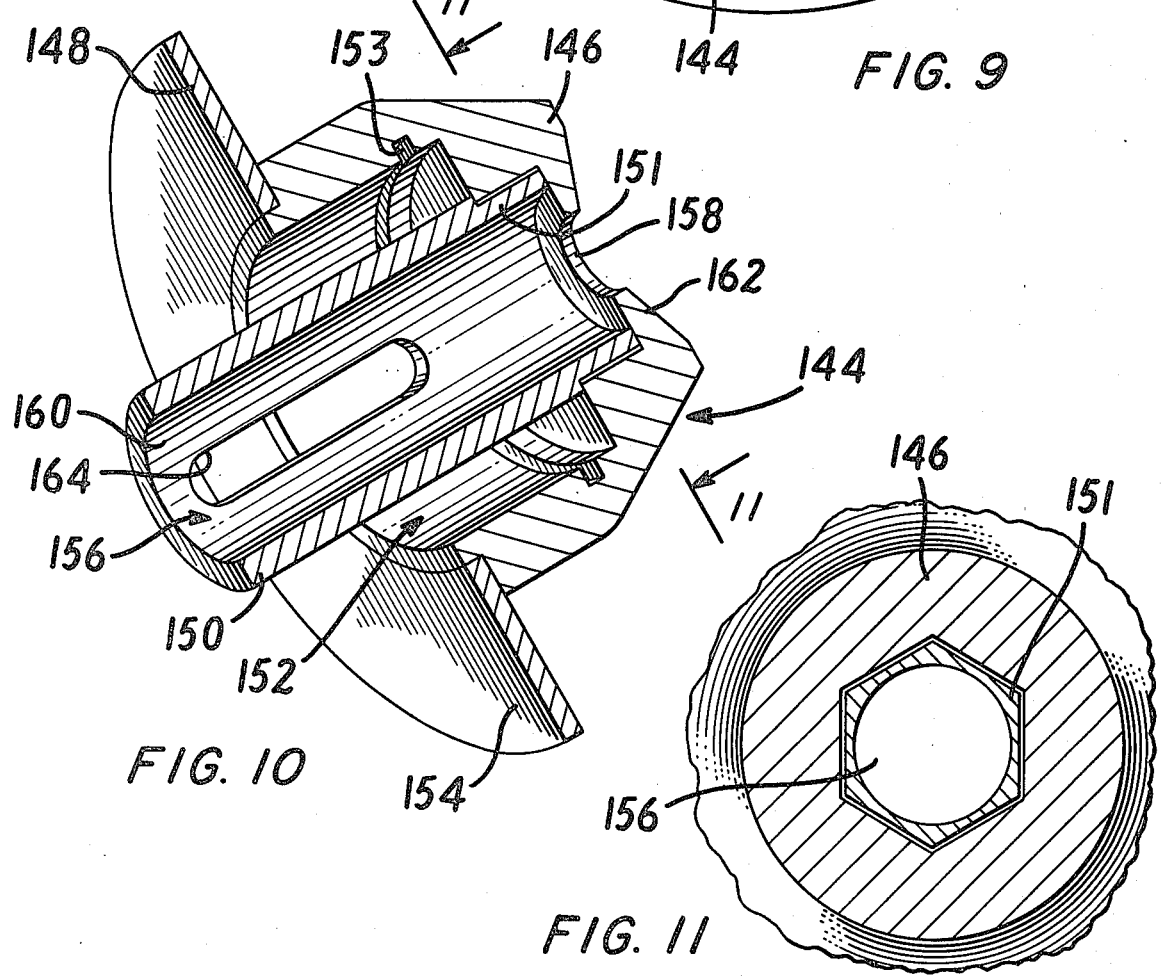
FIG. 10
FIG. 11

LOCKABLE CLOSURE

BACKGROUND OF THE INVENTION

The present invention relates to a lockable closure for a threaded conduit.

As used herein, the term "threaded conduit" includes any hollow structure adapted to contain a fluid which structure has an opening and threads surrounding such opening.

In numerous fluid handling and storage applications, it is desirable to seal the opening of a threaded conduit with a closure which cannot readily be removed by unauthorized persons. For example, when gas utility service to a building is temporarily disconnected, the pipe leading from the gas main into the building ordinarily is left in place but is capped or plugged with a lockable closure having features which impede removal of the closure by unauthorized persons and thus impede access by unauthorized persons to the gas contained in the pipe and in the main.

One form of lockable closure which has been utilized prior to the present invention is the plug sold by E. J. Brooks Co. of Newark, N.J. This plug includes an element having male pipe threads, such threaded element having a boss protruding from an end face coaxially with the threads and a hexagonal bore in the boss. A shield is mounted to the boss of the threaded element for rotation on an axis coincident with the axis of the threads. The shield has a hexagonal bore which is alignable with the hexagonal bore of the threaded element. A hexagonal lug is slidably mounted in the bore of the threaded element, and a spring is provided which biases the lug towards a retracted position in which the lug does not protrude from the boss. The lug and the boss are concealed by the shield; a key may be inserted through a small hole in the shield to engage the lug and pull it to an extended position in which a portion of the lug lies in the hexagonal bore of the threaded element and another portion lies in the hexagonal bore of the shield so that the threaded element is connected to the shield for rotation therewith.

When the threaded element is engaged in the female threads of a threaded conduit, only an end face of the threaded element is exposed, the threaded surfaces of the threaded element being concealed by the conduit. Therefore, it is difficult to directly engage the threaded element for rotation and disengagement from the conduit. Although the shield can readily be engaged and rotated, rotation of the shield will not produce rotation of the plug when the lug is in the retracted position. An authorized person in possession of the proper key can disengage the closure from the conduit by moving the hexagonal plug to its extended position to couple the threaded element to the shield for rotation therewith and rotating the shield.

A corresponding cap for conduits having male threads is also sold by E. J. Brooks Co. This cap is similar to the plug described above except that the threaded element has female pipe threads instead of male pipe threads and the shield has a skirt which coaxially surrounds the threaded element.

SUMMARY OF THE INVENTION

The present invention provides a lockable closure for a threaded conduit which combines security against unauthorized removal of the closure from the conduit with assurance against breakage of the closure during removal by authorized persons. Moreover, the present invention permits the use of diverse types of locking mechanisms in different closures to suit various applications.

A closure according to the present invention includes a threaded element adapted to sealingly engage a conduit. The threads define an axis, and a shield may be releasably or permanently rotatably attached to the threaded element on such axis so that the shield confronts and overlies the threaded element. During engagement of the threaded element with a conduit, the shield protects the threaded element from engagement by a tool, such as a wrench. Means for permitting rotational coupling between the threaded element and a tool upon actuation by key means are provided. If the shield is releasably attached to the threaded element, such means are operative to release the attachment between the shield and the threaded element upon actuation by key means to permit removal of the shield and thus permit direct engagement between a tool and the threaded element. If the shield is permanently attached to the threaded element, the means for permitting rotational coupling are operative to link the threaded element to the shield for rotation therewith so that a tool may be coupled to the threaded element by way of the shield.

Means for impeding linkage of the confronting surfaces of the shield and the threaded element by introduction of an adhesive between such surfaces are preferably provided. Such means hinder any attempt by an unauthorized person to disengage the threaded element from the conduit without use of the proper key by bonding the shield to the threaded element with an adhesive and then rotating the shield.

The shield may be releasably attached to the threaded element by a pin and a lock element movably mounted to the pin. The pin is engaged with the threaded element and the shield. The lock element is maintained in engagement with a mating feature of the threaded element absent actuation by key means to prevent disengagement of the pin from the threaded element. Preferably, the lock element of such a closure is maintained in engagement with the threaded element by a cam mounted to the pin and bearing on the lock element.

In a closure having a shield permanently mounted to the threaded element, the shield preferably includes a stem which is coaxially received in a bore in the threaded element, such stem and bore being coaxial with the threads. A lug is carried by the stem and engagement means are provided to move the lug radially outwardly of the stem so as to engage it in a groove provided in the wall of the bore. The lug, when so engaged, links the threaded element to the shield for rotation therewith.

These and other objects, features and advantages of the present invention will be more readily apparent from the detailed description of the preferred embodiments set forth below when read in conjunction with the accompanying drawings.

BRIEF DESCRIPTION OF THE DRAWINGS

FIG. 1 is a schematic sectional view of a closure according to a first embodiment of the present invention.

FIG. 2 is a sectional view taken along line 2—2 in FIG. 1.

FIG. 3 is a fragmentary schematic sectional view depicting portions of the closure depicted in FIGS. 1 and 2, such portions being depicted in FIG. 3 in a different operating condition from that shown in FIG. 1.

FIG. 4 is a schematic view of a key for use with the closure depicted in FIGS. 1 through 3.

FIG. 8 is a perspective view of a component of the closure depicted in FIGS. 6 and 7.

FIG. 9 is a sectional view similar to FIG. 7, showing the closure depicted in FIGS. 6 and 7 in a different operating condition from that shown in FIG. 7.

FIG. 10 is a perspective view of a component of the closure illustrated in FIGS. 6 and 7, FIG. 10 depicting such component with a portion removed for clarity of illustration.

FIG. 11 is a fragmentary sectional view taken along line 11—11 in FIG. 10.

DETAILED DESCRIPTION OF THE PREFERRED EMBODIMENTS

Figure 5:
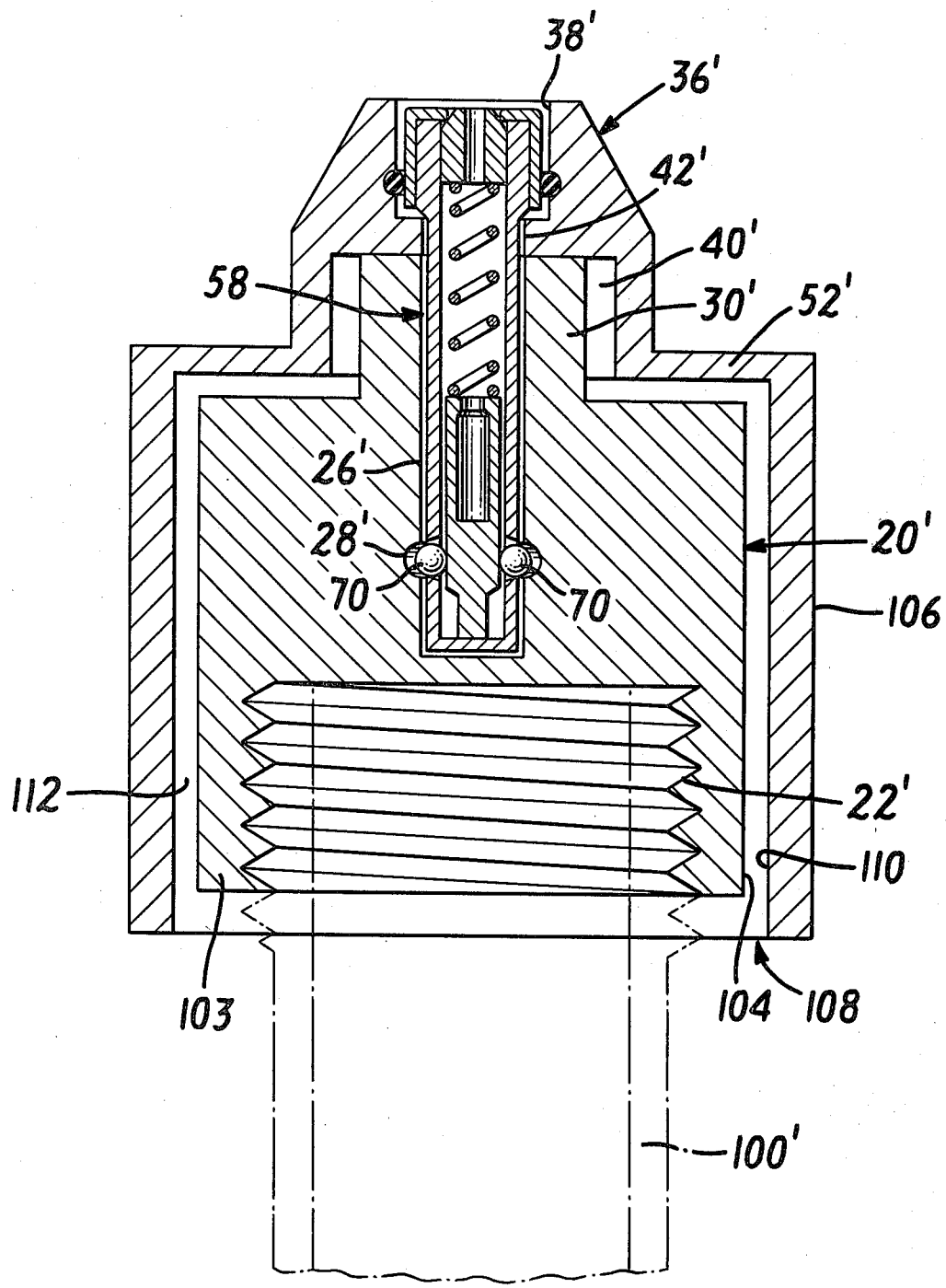
FIG. 5 is a schematic sectional view of a closure according to a second embodiment of the present invention.

As shown in FIG. 1, a closure according to a first embodiment of the present invention includes a threaded element 20 having threads 22 which define an axis 24. Threaded element 20 has an elongated cylindrical blind bore 26 which is open at one end and which is coaxial with threads 22. An annular groove 28 is formed in the circumferential wall of bore 26 and extends entirely around the circumference of the bore is a plane perpendicular to axis 24. Threaded element 20 also has an end face 29 transverse to axis 24 and a boss 30 protruding from face 29 surrounding bore 26. Boss 30 is provided with flat surfaces 32 and cylindrical surface portions 34 (FIG. 2) which are coaxial with bore 26.

Th closure includes a shield 36 in which there is provided a first cylindrical recess 38 on one side, a second cylindrical recess 40 coaxial with the first cylindrical recess on the other side and a cylindrical hole 42 coaxial with recesses 38 and 40 and extending through the shield between the recesses. Shield 36 is also provided with a first shoulder 44 at the juncture of first recess 36 and hole 42 and a second shoulder 46 at the juncture of second recess 40 and hole 42, both of such shoulders extending transversely of the axis. Shield 36 has a frusto-conical exterior surface portion 48 surrounding first recess 38, a cylindrical exterior portion 50 and a disclike flange 52, all of which are coaxial with recesses 38 and 40 and with hole 42. Flange 52 defines a face 54 transverse to the axis of the hole and the recesses, second recess 40 being open to such face.

Second recess 40 of shield 36 is adapted to receive boss 30 of threaded element 20. When boss 30 of threaded element 20 is received in second recess 40 of shield 36, the circumferential wall of second recess 40 overlies the cylindrical surface portions 34 (FIG. 2) of boss 30 so as to maintain second recess 40 and hence hole 42 and first recess 38 of shield 36 in substantially coaxial alignment with bore 26 of threaded element 20. At the same time, face 54 of shield 36 confronts face 29 of threaded element 20, and second shoulder 46 of shield 36 abuts the end of boss 30 to maintain a gap 56 between confronting faces 29 and 54.

A composite lock pin 58 is also provided. This lock pin includes an elongated, cylindrical, tubular body 60 having a cam bore 62 coaxial with its exterior surface. Lock pin 58 has a cylindrical head 64, the exterior surface of the head being defined by a cup shaped shell 66 which is press fit to the body 60. Head 64 is coaxial with body 60 and is located adjacent to the open end of the cam bore 62. Body 60 of lock pin 58 has two diametrically opposed transverse bores 68 extending from the exterior surface of body 60 to cam bore 62 at a point remote from head 64. A spherical lock element 70 is disposed in each of the transverse bores 68, the transverse bores being of lesser diameter than the lock elements so that the lock elements cannot move radially outwardly of the pin beyond the extended positions illustrated in FIG. 1. An elongated, rod-like cam 72 having a cylindrical lobe portion 74 of uniform exterior diameter, a frusto-conical tapered portion 76, a neck portion 78 of lesser diameter than lobe portion 74 and an axially extensive blind bore 80 is coaxially disposed in cam bore 62 so that the open end of blind bore 80 faces towards the open end of cam bore 62. A tubular keeper 82 is press fit in the open end of cam bore 62; a coil spring 86 bears on keeper 82 and cam pin 72 and biases cam pin 72 towards the position illustrated in FIG. 1 in which lobe portion 74 is aligned with transverse bores 68. When lobe portion 74 is aligned with transverse bores 68, it prevents lock elements 70 from moving radially inwardly of the pin from the extended position illustrated in FIG. 1.

Lock elements 70 may be freed for movement to the retracted positions illustrated in FIG. 3 by engaging the cam pin 72 and drawing it towards the open end of the cam bore to move lobe portion 74 away from the tranverse bores 68. Keeper 82 and the disposition of the cam within the cam bore 62 (FIG. 1) impede engagement of cam 72 for this purpose other than by means of a key especially adapted for such engagement. Such a key is schematically depicted in FIG. 4; it includes a body 88 and a pair of elongated fingers 90 and 92 projecting from the body. Fingers 90 and 92 have bulbous end portions 94 and 96 respectively, and have mating sloping surfaces adjacent to such end portions. An eccentric cam 98 is pivotally mounted to the body 88 and appropriate mechanisms (not shown) are provided for moving finger 90 so that when eccentric cam 98 is rotated from the position illustrated in FIG. 4, end portion 94 of finger 90 is brought alongside finger 92. This effectively enlarges the diameter of the distal end of the key. After expansion of distal end of the key in this fashion, continued movement of eccentric cam 98 draws finger 90 toward body 88.

This key may be utilized to engage the cam 72 of the closure illustrated in FIG. 1 by inserting the fingers of the key through the open end of cam bore 62 (i.e., through the bore of keeper 82) and into bore 80 of cam pin 72 until body 88 of the key bears on the head of the pin. After the key has been so inserted, eccentric cam 98 is rotated; expansion of the distal end of the key causes the same to engage the interior surface of bore 80 in cam 72. Continued motion of eccentric cam 98 draws the finger 90 and thus cam 72 back toward the open end of cam bore 62 to the position illustrated in FIG. 3.

As illustrated in FIG. 1, the threaded element 20 of the closure is engaged with a threaded conduit 100, male threads 22 being threadedly and sealingly engaged with corresponding female threads of the conduit. Shield 36 is mounted to threaded element 20, boss 30 of threaded element 20 being received in second recess 40 of shield 36 as described above. Head 64 of lock pin 58 is coaxially disposed in first recess 38 of shield 36; elongated body 60 of pin 58 extends through hole 42 of shield 36 into bore 26 of threaded element 20, the elongated body of the pin being coaxially received in such bore. Lock elements 70 are in their extended positions, and are engaged in annular groove 28 of threaded element 20, so that lock elements 70 limit axial movement of lock pin 58. Head 64 of lock pin 58, being of larger diameter than hole 42, abuts first shoulder 44 of shield 36 so as to limit axial movement of the shield with respect to the lock pin and hence with respect to threaded element 20. Lock pin 58 is rotatable in bore 26 of threaded element 20. Because groove 28 extends around the entire circumference of bore 26, engagement of lock elements 70 in groove 28 does not impede rotation of lock pin 58 with respect to the threaded element. Shield 36 is also rotatable with respect to lock pin 58. Thus, shield 36 is rotatable with respect to threaded element 20 on the axis defined by the bore 26 of the threaded element and the lock pin 58, which axis is coincident with axis 24 of threads 22. Therefore, threaded element 20 cannot be rotated by rotating shield 36. If an unauthorized person attempts to disengage the closure from the conduit by rotating shield 36, the shield will simply spin without rotating the threaded element. Shield 36 and the conduit 100 substantially surround threaded element 20, shield 36 covering the flats 32 of boss 30, so that shield 36 prevents direct engagement of threaded element 20 for rotation and disengagement from the conduit. Annular flange 52 of shield 36 extends outwardly beyond threaded element 20 so that face 54 of the flange confronts the end face of conduit 100.

An unauthorized person intent on removing the closure from the conduit may attempt to introduce an adhesive between the confronting surfaces 54 and 29 to bond such surfaces to one another and thereby link the shield to the threaded element so as to permit disengagement of the threaded element from the conduit by rotation of the shield. However, gap 56 will impede such linkage. To bond effectively the confronting surfaces to one another, one would have to bridge gap 56 with adhesive, and many of the most effective commercially available adhesives, as, for example, the commercially available cyanoacrylate adhesives, do not readily form an effective bond when they are utilized to bridge any substantial gap. Preferably, the gap 56 is between about 1/32 and about ⅛ inch wide and extends at least about ¼ inch inwardly from the exterior of the closure.

At least one, and preferably both, of the confronting surfaces 29 and 54 are adhesive resistant; such adhesive resistant surface or surfaces will further impede linkage of the shield and the threaded element by introduction of an adhesive between the confronting surfaces. The term "adhesive resistant surface" as used herein means a surface to which present commercially available cyanoacrylate adhesives will not form a full strength bond under ordinary room temperature conditions; when such an adhesive is applied to an adhesive resistant surface and cured, the resulting joint will fail in shear at the juncture of the adhesive and the surface at a lower shear loading than that required to fracture the adhesive itself internally. The preferred adhesive resistant surface is a metallic surface coated with a lubricant, and the preferred lubricant for this purpose is graphite.

An unauthorized person may attempt to link shield 36 to threaded element 20 by introducing an adhesive into first recess 38 of shield 36 and bore 26 of threaded element 20 around pin 58. To defeat such an attempt, a resilient O-ring 102 is mounted in an annular groove which extends around the circumferential wall of first recess 38. O-ring 102 sealingly engages shield 36 and head 64 of pin 58. Thus, any adhesive introduced around the outside of head 64 will not flow into bore 26. Although adhesive introduced around head 64 may bond head 64 to shield 36, shield 36 will remain rotatable with respect to threaded element 20 because pin 58 is rotatable in bore 26.

Introduction of an adhesive through the open end of cam bore 62 (i.e., through the bore of keeper 82) will not bond pin 58 to threaded element 20 unless the adhesive so introduced is forced outwardly through transverse bores 68 into bore 26. It will be difficult to force any significant quantity of adhesive through transverse bores 68 while the closure is in the condition illustrated in FIG. 1, because the lock elements 70 substantially occlude transverse bores 68 and because transverse bores 68 are hidden within the closure. Moreover, even if an effective bond between pin 58 and threaded element 20 is obtained in this fashion, shield 36 will still be rotatable with respect to threaded element 20 unless a further quantity of adhesive is introduced between head 64 and the wall of first recess 38 to bond pin 58 to shield 36.

The surfaces defining the recesses of the shield and the bore of the threaded element may be adhesive-resistant, and the exterior surfaces of boss 30 may also be adhesive-resistant. Such additional adhesive-resistant surfaces will further impede any attempt to link the shield and the threaded element by introducing an adhesive therebetween.

The diameter of boss 30 as measured on cylindrical surface portions 34 (FIG. 2) may be slightly smaller than the diameter of recess 40. When this construction is utilized, there will normally be a gap between surface portions 34 and the wall of recess 40. Such gap further impedes adhesive linkage.

Pin 58 is well protected from any assault by battering instruments as it is surrounded, over its entire axial extent, by shield 36 and threaded element 20. Any attempt to break pin 58 by displacing shield 36 transversely of its axis of rotation will be futile. The circumferential wall of second recess 40 will bear on the cylindrical surface portions 34 of boss 30 (FIG. 2) to arrest any such transverse movement of shield 36 and thus protect pin 58.

To permit disengagement of the threaded element from the conduit, cam 72 is actuated by the key to permit movement of lock elements 70 to their respective retracted positions, so that lock pin 58 may be slid axially outwardly from bore 26. Shield 36 may thus be removed from threaded element 20 to expose the flats 32 of boss 30. A wrench may then be engaged with the flats and threaded element 20 may be unscrewed from conduit 100. While the pin 72 is held in its retracted position, and lock elements 70 are thus free to move to their respective retracted positions, pin 58 may be removed from shield 36. A reverse sequence of operations is utilized to assemble the closure and install it on a conduit.

Subassemblies including a pin, keeper, spring, cam and lock elements suitable for use in the closure described above are commercially available; one such subassembly is sold by E. J. Brooks Co. of Newark, N.J., and keys suitable for use with this subassembly are available from the same source. The commercially available subassemblies and keys suitable for use therewith are commonly used in the gas utility industry for other purposes (as in connection with lockable valves). Therefore, it is desirable to construct the shield and threaded element of the closure described above so that such a commercially available subassembly can be employed if the closure is to be utilized in the gas utility industry.

A closure according to a second embodiment of the present invention is depicted in FIG. 5. This closure is similar to the closure described above, but threaded element 20' of the closure depicted in FIG. 5 has female pipe threads 22' defining an axis 24', such threads being adapted threadedly and sealingly to engage mating male pipe threads of a conduit 100'. Threaded element 20' includes a cylindrical body 103, threads 22' extending from an end wall of body 103, such threads being coaxial with the exterior circumferential surface 104 of body 103. Shield 36' includes a tubular skirt 106 extending axially from its flange 52'. Tubular skirt 106 defines a cylindrical bore 108 coaxial with recesses 38' and 40' and hole 42' of the shield, bore 108 being of larger diameter than body 103. When the shield 36' is assembled to the threaded element 20' as illustrated in FIG. 5, cylindrical body 103 of threaded element 20' is coaxially received in bore 108 of skirt 106 and boss 30' of threaded element 20' is coaxially received in second recess 40' of shield 36' so that the shield surrounds the threaded element over its entire axial extent. The bore defining interior surface 110 of skirt 106 confronts the exterior surface 104 of cylindrical portion 103 of the threaded element 20', but such surfaces are radially spaced from one another so that they define a gap 112 between them adjacent to the exterior of the closure, surfaces 110 and 104 preferably being adhesive resistant.

As illustrated in FIG. 5, a pin 58 is engaged with shield 36' and threaded element 20', pin 58 extending into bore 26' of the threaded element and being retained therein by engagement of lock elements 70 in annular groove 28'. The shield may be removed from the threaded element, and the pin may be removed from the shield in the same fashion as described above with reference to FIGS. 1 through 4.

Figure 6:
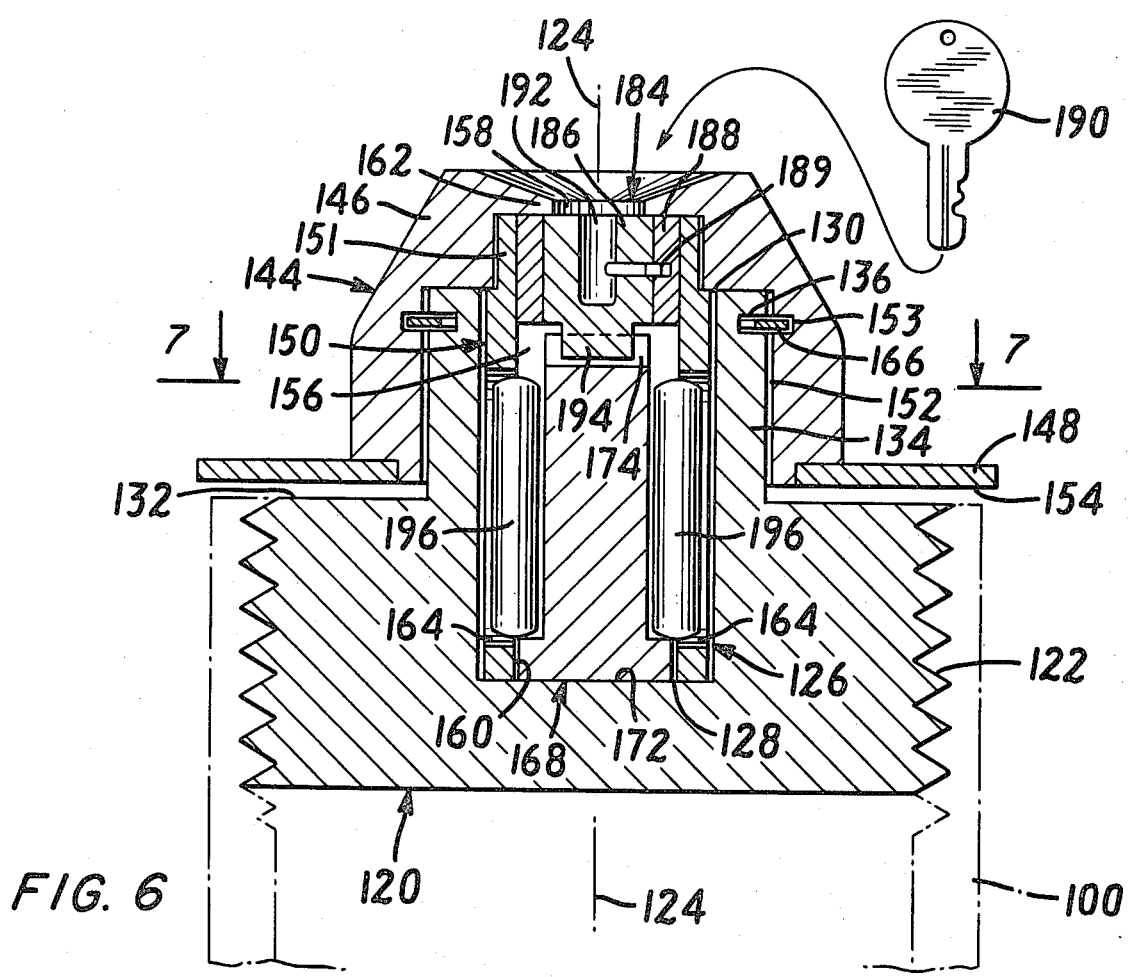
FIG. 6 is a schematic sectional view of a closure according to a third embodiment of the present invention.

In a closure according to a third embodiment of the present invention, the shield is permanently mounted to the threaded element. As shown in FIG. 6, such a closure includes a threaded element 120 which has male pipe threads 122 about an axis 124 and a stem bore 126 extending coaxially with threads 122 from end wall 128 to an open end 130. Threaded element 120 is also provided with an end face 132 transverse to axis 124 and with boss 134 projecting from such face. Boss 134 coaxially surrounds the portion of stem bore 126 adjacent open end 130. The exterior surface of boss 134 has an annular groove 136.

Figure 7:
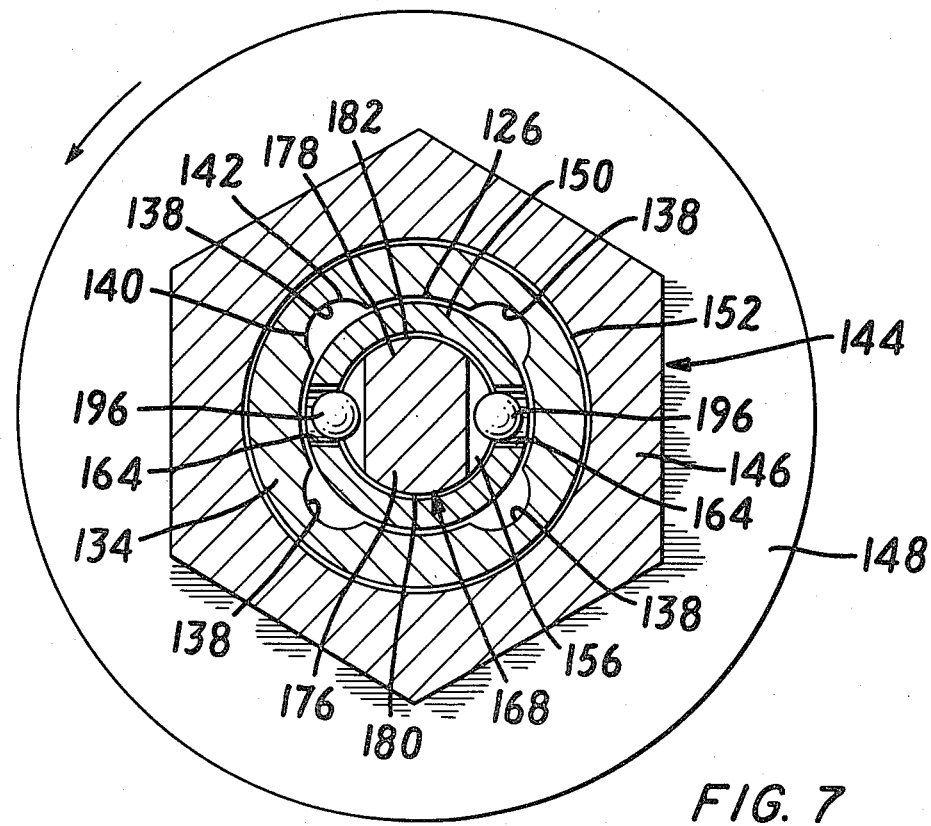
FIG. 7 is a sectional view taken along line 7—7 in FIG. 6.

Threaded element 120 is provided with a plurality of grooves 138 (FIG. 7) in the circumferential wall of stem bore 126. Each groove 138 extends axially along the wall of the bore 126 from open end 130 to a point adjacent to end wall 128, each such groove being of only limited extent about the circumference of the bore. Each groove 138 has a first ramp surface 140 which slopes radially inwardly (toward the center of bore 126) in the circumferential direction corresponding to the unscrewing direction of rotation of threads 122, (i.e., in the counterclockwise direction as seen in FIG. 7), and each groove 138 is further provided with a second ramp surface 142 which slopes radially inwardly in the opposite circumferential direction. Grooves 138 are arranged in pairs, the grooves of each such pair being diametrically opposed to one another.

The closure includes a composite shield 144 which is separately illustrated in FIG. 10. Shield 144 is formed from a cap element 146, a flat annular flange 148 fixedly attached to the cap element as by press fitting or welding and an elongated stem 150. Stem 150 has a hexagonal section 151 at one end. As seen in FIG. 11, hexagonal section 151 is received in a mating socket formed in cap element 146. Shield 144 is provided with a cylindrical recess 152 (FIG. 10) coaxially surrounding stem 150 over a portion of its length and a radially inwardly facing annular groove 153 in the circumferential wall of such recess. Face 154, transverse to the axis of stem 150, is provided on flange 148, recess 152 being open to face 154. Shield 144 is also provided with cam bore 156 extending through cap element 146 and extending coaxially through stem 150, cam bore 156 having a first open end 158 at cap element 146 and a second open end 160 at the end of stem 150 remote from cap element 146. Cap element 146 has shoulder 162 projecting radially inwardly into cam bore 156 adjacent first open end 158 thereof. Stem 150 has two diametrically opposed slotlike openings 164, of which only one is visible in FIG. 10 each of such openings extending axially along the stem.

As seen in FIG. 6, shield 144 is mounted to threaded element 120 for rotation on axis 124, stem 150 of the shield being coaxially received in stem bore 126 of the threaded element. Boss 134 of the threaded element is coaxially received in recess 152 of the shield, so that the outwardly facing groove 136 in the circumferential wall of boss 134 is aligned with the inwardly facing groove 153 in the circumferential wall of recess 152. A snap ring 166 is disposed in the aligned grooves 153 and 136 to retain cap element 146 on threaded element 120. End wall 128 of stem bore 126 confronts the end of stem 150 remote from cap element 146. End wall 128 thus limits displacement of the stem relative to the cap element and prevents disengagement of stem 150 from cap element 146.

The closure includes an elongated cam 168, separately illustrated in FIG. 8. Cam 168 defines an axis 170, an end wall 172 at one end and a rectangular slot 174 at the axially opposite end. Cam 168 has a first lobe 176 extending radially outwardly from axis 170 in one direction and a second, diametrically opposed, lobe 178 extending radially outwardly from axis 170 in the opposite direction. First lobe 176 has a cylindrical crown surface 180 and second lobe 178 has a similar crown surface 182, both of such crown surfaces being elements of a surface of revolution about axis 170.

Cam 168 is coaxially rotatably disposed in cam bore 156, (FIG. 6) slot 174 being adjacent first open end 158 of the cam bore, and end face 172 being adjacent second open end 160 of the cam bore. End wall 128 of the stem bore retains cam 168 in the cam bore. Lobes 176 and 178 extend radially of stem 150, crown surfaces 180 and 182 of the lobes closely confronting the circumferential wall of cam bore 156 to prevent movement of cam 168 transverse to the axis of the stem.

A pin-tumbler lock assembly 184 including a cylinder 186 and a shell 188 is disposed in cam bore 156 adjacent first open end 158. Mechanisms including at least one tumbler 189 within the lock assembly normally prevent rotation of cylinder 186 with respect to shell 188, but, upon insertion of a conventional key 190 into the key hole 192, cylinder 186 may be rotated on its axis within shell 188. Shell 188 is fixedly mounted in cam bore 156 so that the axis of rotation of cylinder 186 with respect to shell 188 is coincident with the axis of the cam bore. Shoulder 162 of shield 144 partially overlies lock assembly 184 to retain it against axial movement outwardly through first open end 158 of cam bore 156. Cylinder 186 has a rectangular projection 194 which is disposed in the rectangular slot 174 of cam 168 so that cam 168 is connected to cylinder 186 for rotation therewith. Thus, cam 168 can only be rotated with respect to shield 144 if the appropriate key is inserted in the key hole of cylinder 186.

Two elongated cylindrical lugs 196 are disposed in the openings 164 of stem 150. As best appreciated by reference to FIG. 7, lugs 196 are free to move radially of stem 150, but the radially extensive walls of the slot-like openings 164 constrain lugs 196 to move around the axis with stem 150 during rotation of shield 144.

As illustrated in FIGS. 6 and 7, the closure is connected to a threaded conduit 100, threads 122 of threaded element 120 being threadedly and sealingly engaged with mating female threads of conduit 100. Cam 168 and lock assembly 184, which cooperatively constitute the engagement means of the closure, are shown in a disengaged condition, cam 168 being in a disengaged position in which lobes 176 and 178 are remote from openings 164 of stem 150. When the cam is in this disengaged position, the shield 144 is freely rotatable with respect to threaded element 120 about axis 124. As a result, threaded element 120 cannot be disengaged from conduit 100 by turning shield 144 as such an attempt would merely rotate shield 144 with respect to threaded element 120. Such rotation of shield 144 will align lugs 196 with various ones of the grooves 138 and upon such alignment one or both of lugs 196 may move radially outwardly of stem 150 in openings 164 and thus enter respective ones of grooves 138. However, upon continued rotation of shield 144 in the direction corresponding to the unscrewing rotational direction of threads 122 (the counterclockwise direction as seen in FIG. 7) each lug 196 will ride along the first ramp surface 140 of the groove 138 which it has entered, and each lug 196 will thus be forced radially inwardly of the stem, back to the position illustrated in FIG. 7. Likewise, if shield 144 is rotated in the direction corresponding to the tightening direction of rotation of threads 122 (the clockwise direction as seen in FIG. 7), each lug 196 may enter one of the grooves 138, but upon continued rotation of shield 144, each lug will encounter the second ramp surface 142 of the groove which it has entered and each lug will thus be forced radially inwardly of stem 150 back to the position illustrated in FIG. 7.

An authorized person in possession of the proper key 190 can actuate the engagement means (the lock assembly and the cam) to engage lugs 196 in grooves 138 and retain them in such engagement so that the lugs will link shield 144 to threaded element 120 for rotation therewith. The shield is first rotated with respect to the threaded element until both of the openings 164 of the stem are simultaneously aligned with respective ones of the grooves 138. The key is then used to turn cylinder 186 of the lock assembly so as to rotate cam 168 to the engaged position illustrated in FIG. 9, in which lobes 176 and 178 of the cam are aligned with respective ones of the openings 164 in stem 150. Rotation of the cam from its disengaged position to its engaged position forces both lugs 196 radially outwardly of stem 150 so that both lugs are simultaneously engaged in respective ones of the grooves 138.

Crown surface 180 of lobe 176 confronts one lug 196, and crown surface 182 of lobe 178 confronts the other lug 196 when cam 168 is in its engaged position. Upon rotation of shield 144 and hence of stem 150, each lug 196 will encounter one of the ramp surfaces 140 or 142 of the groove in which it is engaged, and each lug will thus be urged radially inwardly. However, each lug will bear on one of the crown surfaces of the cam and will thus be retained in engagement in one of the grooves 138. As each lug 196 is engaged in one of the grooves 138 and is also engaged in one of the openings 164 of the stem, the lugs will connect the stem and hence the entire shield to the threaded element for rotation therewith in either direction. Thus, threaded element 120 can be unscrewed from conduit 100 or further tightened on the conduit.

Substantial radially inwardly directed forces may be applied to lugs 196 by the ramp surfaces of grooves 138 when threaded element 120 is being driven for rotation through lugs 196 as described above, and such radially inwardly directed forces will vary directly with the torque applied to the threaded element through the shield and lugs. Such radially inwardly directed forces will in turn be applied by the lugs to the cam through its crown surfaces 180 and 182. Because the crown surfaces 180 and 182 are of uniform radial extent, such radially inwardly directed forces will be directed perpendicularly of crown surfaces 180 and 182 and hence will not produce any substantial torque on cam 168. Therefore, the radially inwardly directed forces applied to lugs 196 will not produce any substantial torque on lock assembly 184. Because lugs 196 are diametrically opposed to one another, the radially inwardly directed forces applied to the lugs by the ramp surfaces of the grooves will oppose one another and therefore will not tend to bend stem 150. Thus, when the lock assembly and cam are in their engaged condition, substantial threading and unthreading torques can be applied to the threaded element without fear of damaging the closure.

The closure described above with reference to FIGS. 6 through 9 is protected against physical assault by the interengaging features of the shield and the threaded element. As set forth above, boss 134 of the threaded element is coaxially received in recess 152 of the shield. If an unauthorized person attempts to defeat the closure by battering shield 144, the exterior circumferential wall of boss 134 will engage the interior circumferential wall of recess 152 so as to prevent any movement of shield 144 transversely of stem bore 126 and thus protect stem 150. Likewise, the end wall of boss 134 will engage the end wall of recess 152 to prevent axial movement of shield 144 towards threaded element 120 and thus prevent crushing or other damage to the lock assembly, the cam and the lugs.

Because lock assembly 184 is disposed in the cam bore and is partially covered by shoulder 162, lock assembly 186 is especially secure against direct physical assault.

In a manner similar to that of the closure described above with reference to FIGS. 1 through 4, the confronting surfaces 132 and 154 define a gap between them, and such confronting surfaces may be made adhesive resistant. The gap and the adhesive resistance of the confronting surfaces will impede any attempt to link shield 144 to threaded element 120 by introducing an adhesive between such confronting surface. Because keyhole 192 does not communicate with stem bore 126, shield 144 cannot readily be linked to threaded element 120 by introducing an adhesive through the keyhole. Preferably, the exterior surfaces of boss 134, stem 150 and lugs 196, and the interior surfaces of recess 152 are adhesive resistant.

Although the lock assembly 184 has been described as being a pin-tumbler assembly, other types of lock assemblies may be utilized as well. Merely by way of example, lock assemblies of the type sold under the trademark ABLOY by Wartsila, Inc., Niles, Ill., may be utilized. Various closures according to this embodiment of the present invention may be provided with lock assemblies requiring various different key configurations to actuate them so as to provide increased security.

The closure described with reference to FIGS. 6 through 11 can be assembled by the following procedure: Stem 150 and flange 148 are assembled to the cap element 146 to form shield 144. Lock assembly 184 and cam 168 are inserted into the cam bore through the open end of such bore remote from the cap element, and lugs 196 are placed in openings 164 of the stem. Snap ring 166 is assembled to threaded element 120 and stem 150 of the shield is partially inserted into stem bore 126 of the threaded element. Then the stem is inserted further into the stem bore until boss 134 of the threaded element enters recess 152 of the shield and snap ring 166 pops into place.

In variations of this closure, the stem may be welded to the cap element or formed integrally therewith and the hexagonal section 151 (FIG. 11) of the stem may be omitted.

This closure may be provided in a form suitable for use with conduits having male threads. In such a closure, the threaded element is provided with female threads rather than with male threads, and the shield is provided with a tubular skirt coaxially surrounding the body of the threaded element so that the shield surrounds the threaded element over its entire axial extent. In these respects, such a closure is similar to that described above with reference to FIG. 5.

Although the threaded elements of all of the closures described above have conventional pipe threads adapted to sealingly engage pipe threads on a conduit, the threaded element can also be provided with other types of threads. Certain types of conduits are provided with threaded which are not adapted for sealing engagement with other threads. The threaded element of a closure to be used with such a conduit should be provided with a gasket or other feature adapted to sealingly engage the conduit.

The closures of the present invention may be fabricated from any suitable materials, such materials being chosen according to conventional criteria of strength, cost, ease of fabrication and compatability with environmental conditions. Preferably, the shields are of hardened steel so that they will resist cutting or drilling.

As numerous variations and combinations of the features described above can be utilized without departing from the spirit of the present invention, the foregoing description of the preferred embodiments should be understood by way of illustration rather than by way of limitation of the present invention as described in the claims.

What is claimed is:

1. A lockable closure for a threaded conduit comprising:
  (a) a threaded element adapted sealingly to engage the conduit, the threads of such element defining an axis;
  (b) a shield rotatably attached to said threaded element on said axis, said shield at least partially covering said threaded element, a surface of said shield confronting a surface of said threaded element so that during engagement of said threaded element with said conduit, said shield impedes direct engagement of said threaded element by a tool;
  (c) means for permitting rotational coupling between said threaded element and a tool upon actuation by key means; and
  (d) said confronting surfaces defining therebetween means including a gap for impeding linkage of said confronting surfaces by introductions of an adhesive material.

2. A lockable closure for a threaded conduit comprising:
  (a) a threaded element adapted sealingly to engage the conduit, the threads of such element defining an axis;
  (b) a shield rotatably attached to said threaded element on said axis, said shield at least partially covering said threaded element, a surface of said shield confronting a surface of said threaded element so that during engagement of said threaded element with said conduit, said shield impedes direct engagement of said threaded element by a tool;
  (c) means for permitting rotational coupling between said threaded element and a tool upon actuation by key means; and
  (d) means for impeding linkage of the confronting surfaces of said shield and said threaded element by introduction of an adhesive therebetween, one of said confronting surfaces having an adhesive resistant lubricant coating and said impeding means including such adhesive resistant surface.

3. A closure as claimed in claim 1 in which said lubricant is graphite.

4. A closure as claimed in claim 1 in which both of said confronting surfaces are adhesive resistant.

5. A closure as claimed in claim 1 in which said means for permitting rotational coupling is operative to permit removal of said shield from said threaded element upon actuation by key means.

6. A lockable closure for a threaded conduit comprising:
  (a) a threaded element having a stem bore therein coaxial with the threads of said element, said bore being open at one end, said element also having elongate groove means in the circumferential wall of said stem bore;
  (b) a shield having a stem defining a cam bore and formed with elongate slot means, said shield being rotatably mounted to said threaded element with said stem coaxially disposed in said stem bore, said shield at least partially covering said threaded element to impede direct engagement of said threaded element by a tool;
  (c) lug means carried by said slot means formed in said stem, said lug being alignable with said groove means; and
  (d) a cam disposed in said cam bore and being formed with lobe means and being movable between a first position in which said lobe means are out of contact with said lug means and a second position in which said lobe means contact said lug means and urge the same partially to extend into said groove means thus to lock said shield against rotation relative to said threaded element;
(e) key actuated means for controlling the position of said cam, one of said key actuated means and said cam being formed with a recess and the other with a projection nesting in said recess to transmit rotary movement from said key actuated means to said cam; and
(f) confronting surfaces on said shield and on said threaded element defining therebetween means including a gap for inpeding linkage of said confronting surfaces by introduction of an adhesive material.

7. A lockable closure according to claim 6 wherein said elongate groove means comprise at least one pair of diametrically opposed grooves the longitudinal dimensions of which are parallel to the longitudinal axis of said stem bore, said elongate slot means comprise a pair of diametrically opposed slots the longitudinal dimensions of which are parallel to the longitudinal axis of said stem bore and said lug means comprise a pair of elongate cylindrical members.

8. A lockable closure for a threaded conduit comprising:
(a) a threaded element having a stem bore therein coaxial with the threads of said element, said bore being open at one end, said element also having elongate groove means in the circumferential wall of said stem bore;
(b) a shield having a stem defining a cam bore and formed with elongate slot means, said shield being rotatably mounted to said threaded element with said stem coaxially disposed in said stem bore, said shield at least partially covering said threaded element to impede direct engagement of said threaded element by a tool;
(c) lug means carried by said slot means formed in said stem, said lug being alignable with said groove means; and
(d) a shell fixedly mounted in said stem, a cylinder rotatably mounted in said shell and pin means adapted to lock said cylinder against rotation relative to said shell, said cylinder including a rectangular projection extending toward the closed end of said stem bore;
(e) a cam disposed in said cam bore and formed with a slot for receiving said rectangular projection, said cam being formed with lobe means and being rotatable upon rotation of said cylinder, said lug means being urged by said lobe means, when the latter is in one rotational position, to extend into said groove means thus to lock said stem and said threaded element against relative rotation whereby rotation of said shield will effect rotation of said threaded element, said lug means being free of said urging when said lobe means is in another rotational position thus to allow said shield to rotate freely relative to said threaded element; and
(f) confronting surfaces on said shield and on said threaded element defining therebetween means including a gap for impeding linkage of said confronting surfaces by introduction of an adhesive material.

* * * * *

UNITED STATES PATENT AND TRADEMARK OFFICE
CERTIFICATE OF CORRECTION

PATENT NO. : 4,362,035
DATED : December 7, 1982
INVENTOR(S) : STEVEN VITALE

It is certified that error appears in the above-identified patent and that said Letters Patent is hereby corrected as shown below:

Claim 3, line 1, change "1" to --2--.
Claim 4, line 1, change "1" to --2--.
Claim 5, line 1, change "1" to --2--.

Signed and Sealed this

Twenty-second Day of February 1983

[SEAL]

Attest:

GERALD J. MOSSINGHOFF

Attesting Officer    Commissioner of Patents and Trademarks